US008856851B2

(12) United States Patent
Davis

(10) Patent No.: US 8,856,851 B2
(45) Date of Patent: Oct. 7, 2014

(54) APPARATUS AND METHOD FOR CONTROLLING A NETWORK-CONNECTED DEVICE IN ONE PEER NETWORK FROM AN INFRARED DEVICE CONNECTED TO ANOTHER PEER NETWORK USING TCP/IP AND INFRARED SIGNALS

(76) Inventor: David Marshall Davis, San Francisco, CA (US)

( * ) Notice: Subject to any disclaimer, the term of this patent is extended or adjusted under 35 U.S.C. 154(b) by 1115 days.

(21) Appl. No.: 12/340,634

(22) Filed: Dec. 19, 2008

(65) Prior Publication Data

US 2010/0162335 A1    Jun. 24, 2010

(51) Int. Cl.
*H04N 7/173* (2011.01)
*H04N 7/16* (2011.01)
*G06F 15/16* (2006.01)
*G06F 15/177* (2006.01)
*H04N 21/462* (2011.01)
*H04L 29/08* (2006.01)
*H04L 12/28* (2006.01)
*H04L 29/06* (2006.01)
*H04N 21/63* (2011.01)
*G08C 23/04* (2006.01)
*G06F 9/44* (2006.01)
*H04N 21/436* (2011.01)
*H04N 21/41* (2011.01)
*H04N 5/44* (2011.01)
*H04L 12/18* (2006.01)

(52) U.S. Cl.
CPC ........ *H04L 12/2838* (2013.01); *H04N 21/4622* (2013.01); *H04L 29/08306* (2013.01); *H04N 7/17318* (2013.01); *H04L 29/06027* (2013.01); *H04N 7/173* (2013.01); *H04N 21/632* (2013.01); *G08C 23/04* (2013.01); *H04N 7/17309* (2013.01); *G06F 9/4416* (2013.01); *H04N 21/43615* (2013.01); *H04L 29/06034* (2013.01); *H04L 29/06* (2013.01); *H04L 29/08981* (2013.01); *H04N 21/4126* (2013.01); *H04L 29/08072* (2013.01); *H04N 5/4401* (2013.01); *H04L 29/06326* (2013.01); *H04L 12/1822* (2013.01); *H04N 21/63* (2013.01)
USPC .......... 725/110; 725/131; 725/139; 709/204; 709/205; 709/206; 709/220; 709/221; 709/222

(58) Field of Classification Search
None
See application file for complete search history.

(56) References Cited

U.S. PATENT DOCUMENTS

| 5,778,406 | A  | * | 7/1998 | Willard ............................. 711/1 |
| 6,212,633 | B1 | * | 4/2001 | Levy et al. .................... 713/153 |
| 6,898,618 | B1 | * | 5/2005 | Slaughter et al. ............. 709/203 |
| 7,206,841 | B2 | * | 4/2007 | Traversat et al. ............. 709/225 |

(Continued)

*Primary Examiner* — Brian T Pendleton
*Assistant Examiner* — Jonathan V Lewis
(74) *Attorney, Agent, or Firm* — Invent Capture, LLC.; Samuel S. Cho

(57) ABSTRACT

An apparatus and a method for controlling a network-connected device in one peer network from an infrared (IR) device connected to another peer network is disclosed. Regardless of underlying communication protocols used in peer networks, the IR device in a peer network can request a transfer of data or control to a networked device in another peer network. Communication compatibility among the two peer networks are maintained by utilizing a set-top box in each peer network configured to communicate with another set-top box using a transport control protocol (TCP), which may be different from underlying protocols (e.g. X.25, IrDA) between the set-top box and locally connected devices to the set-top box. The set-top box may utilize an intelligent routing scheme based on a packet header and/or payload content examination to route the transfer of data to a "most-appropriate" electronic device connected to the set-top box.

5 Claims, 7 Drawing Sheets

(56) References Cited

U.S. PATENT DOCUMENTS

| | | | |
|---|---|---|---|
| 2002/0059456 A1* | 5/2002 | Ha et al. | 709/246 |
| 2003/0106067 A1* | 6/2003 | Hoskins et al. | 725/119 |
| 2003/0179750 A1* | 9/2003 | Hasty et al. | 370/390 |
| 2003/0237097 A1* | 12/2003 | Marshall et al. | 725/105 |
| 2004/0078829 A1* | 4/2004 | Patel et al. | 725/135 |
| 2004/0088646 A1* | 5/2004 | Yeager et al. | 715/500 |
| 2004/0117038 A1* | 6/2004 | Karaoguz et al. | 700/11 |
| 2005/0076092 A1 | 4/2005 | Chang et al. | |
| 2006/0080706 A1* | 4/2006 | Liebhold et al. | 725/38 |
| 2006/0248553 A1* | 11/2006 | Mikkelson et al. | 725/23 |
| 2006/0277580 A1* | 12/2006 | Scheelke | 725/78 |
| 2007/0016921 A1* | 1/2007 | Levi et al. | 725/35 |
| 2008/0010653 A1* | 1/2008 | Ollikainen et al. | 725/25 |
| 2008/0301745 A1* | 12/2008 | Liu et al. | 725/110 |
| 2009/0158382 A1* | 6/2009 | Shaffer et al. | 725/131 |
| 2009/0300673 A1* | 12/2009 | Bachet et al. | 725/31 |
| 2010/0146068 A1* | 6/2010 | Haviv | 709/212 |
| 2011/0145863 A1* | 6/2011 | Alsina et al. | 725/44 |

\* cited by examiner

Example of an IR Device to a STB

APPARATUS AND METHOD FOR CONTROLLING A NETWORK-CONNECTED DEVICE IN ONE PEER NETWORK FROM AN INFRARED DEVICE CONNECTED TO ANOTHER PEER NETWORK USING TCP/IP AND INFRARED SIGNALS

BACKGROUND OF THE INVENTION

The present invention generally relates to communicating with networked electronic devices. More specifically, the invention relates to an apparatus and a method for controlling a network-connected device in one peer network from an infrared device connected to another peer network using a Transport Control Protocol and Internet protocol (TCP/IP) and infrared signals. The invention also relates to transferring a level of control of a set-top box operatively connected to another set-top box via a TCP layer.

An increasingly ubiquitous broadband availability of the Internet allows one user to connect to another user via social networks, messenger systems, e-mails, web portals, and a variety of other networked means to transfer, share, and control networked devices and their related data. Today's computer users are exposed to a vast array of choices to connect to their peers using one or more communication networks. However, many available tools for transferring, sharing, and/or controlling networked devices and their related data among users still require installation of application-specific software, a multiple level of network connections (e.g. the Internet, a LAN, a home-appliance network, a closed-circuit private network, and etc.), and a familiarity with certain computer systems. As a result, consumers who do not possess dexterous computer skills or at least some degree of technical aptitude are still hesitant to use currently-available tools to transfer, share, and/or control networked devices and their related data over a multiple number of communication networks with their friends, family members, or colleagues.

Furthermore, a current trend of increased network interoperability requirement and digital convergence of computer systems and a variety of previously-standalone electronic devices (e.g. more demanding interoperability requirement among the Internet, a local-area network (LAN), a personal-area network (PAN) such as Bluetooth and RFID, and previously closed-circuit private network such as a security camera network) place even a heavier burden on consumers to troubleshoot application-specific frustrations arising from device or network incompatibility.

As an example, a household air conditioner in a home appliance network using an alternate current(AC)-modulated communication protocol such as X.25 may now be connected to a wide-area network (WAN) such as the Internet, wherein a user is capable of controlling the household air conditioner beyond the range of the X.25 protocol by simply accessing an Internet terminal. In one instance, the home appliance network may comprise the household air conditioner, a telephone, a television, a dishwasher, an alarm system, and other devices which are simply connected to a household AC outlet using the X.25 protocol which are made compatible to the Internet using a compatible gateway. In another instance, the home appliance network using the X.25 protocol may have a gateway to a local area network (LAN) which includes household computers, wherein the LAN is further connected to an Internet gateway, thereby providing an indirect interoperability between a X.25-connected home appliance device and an Internet-connected device even thousands of miles of away from home.

The increasing complexity in network configurations and interoperability requirement for a variety of networks complicate installation, maintenance, and use of network-connected electronic devices from a user perspective. It is especially burdening for a user to find a simple and durable way to transfer, share, and/or control networked devices and their related data over a variety of different communication networks with their friends, family members, or colleagues.

Therefore, it is highly advantageous to devise an apparatus and a method for controlling a device connected to one user's network from another device connected to another user's network without manual configuration of network interoperability.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an apparatus for controlling a network-connected device in one peer network from an infrared (IR) device connected to another peer network is disclosed. The apparatus comprises a first peer network comprising a first set-top box and the IR device, wherein the IR device is configured to control one or more network devices across a plurality of peer networks and wherein the first set-top box is capable of intelligent routing of incoming data to a particular network device by examining an incoming packet header and/or one or more packet payload contents, a local area network (LAN) and/or a wide area network (WAN) operatively connected to the first peer network, and a second peer network comprising a second set-top box, wherein the second set-top box is configured to receive a control transfer request and/or a data transfer request from the first peer network and wherein the second set-top box is operatively connected to the LAN and/or the WAN.

Furthermore, a method for controlling a network-connected device in a second peer network from an infrared (IR) device connected to a first peer network is also disclosed. The method comprises steps of initiating a command from the IR device to connect a first set-top box of the first peer network to a second set-top box of the second peer network, wherein the first set-top box and the second set-top box are connected by TCP/IP via a LAN and/or a WAN, attempting to authenticate and/or authorize the command from the IR device to the second set-top box, informing the IR device and/or the first set-top box in the first peer network an authorization or a denial of the command from the second set-top box, and if the authorization for the command is granted by the second set-top box: issuing or completing a control and/or a data transfer request from the IR device, wherein the control and/or the data transfer request is initially sent to the first set-top box which is configured to relay the control and/or the data transfer request to the second set-top box or a local device connected to the second set-top box in the second peer network, and if the data transfer request from the IR device is fulfilled by the second set-top box and/or the local device connected to the second set-top box: transmitting relevant data from the second set-top box and/or the local device connected to the second set-top box to the first set-top box, and performing an incoming packet header and/or packet payload content examination on the relevant data received by the first set-top box to route the relevant data to a "most-appropriate" electronic device connected to the first set-top box.

DETAILED DESCRIPTION

Figure 1:
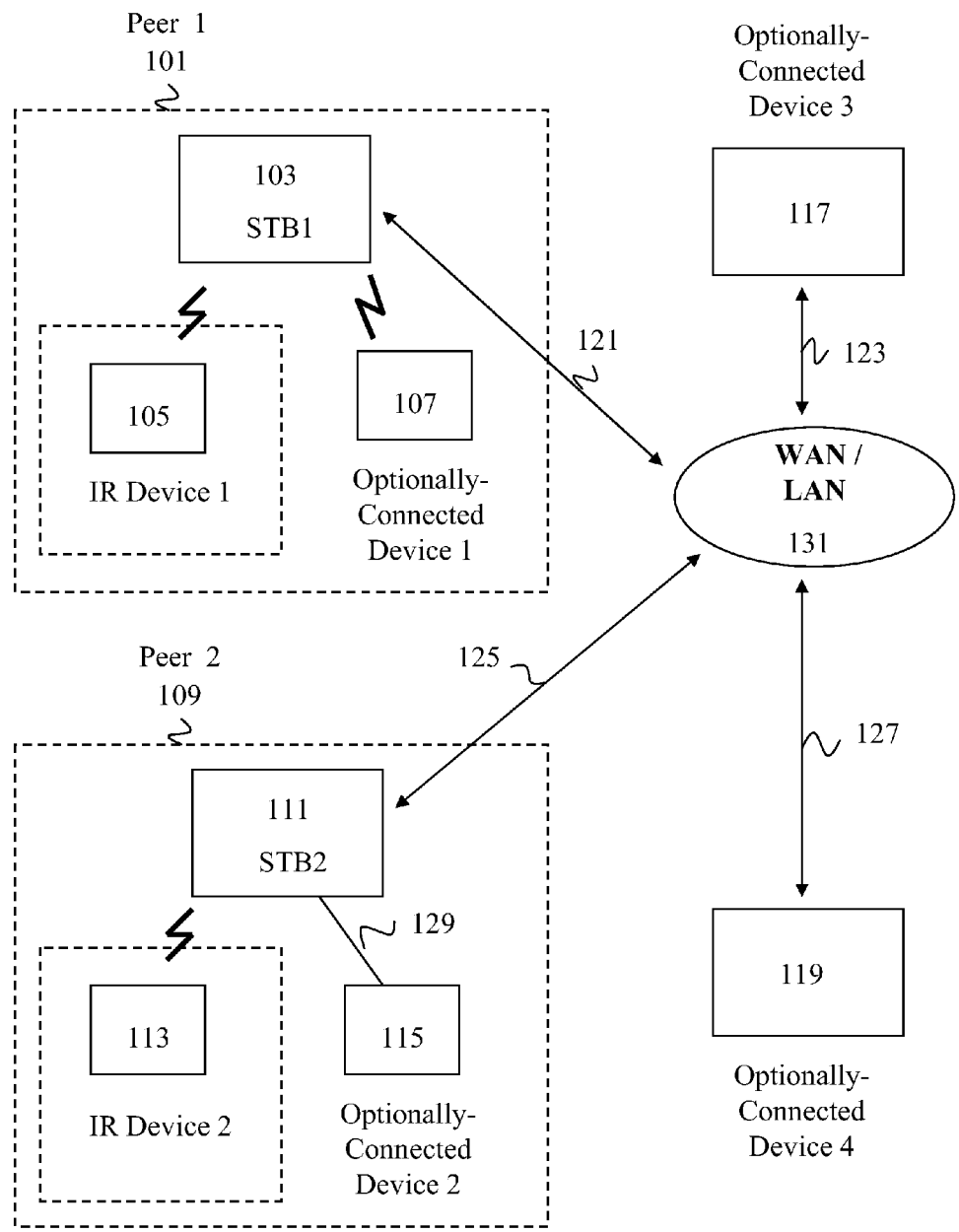
FIG. 1 shows a conceptual network configuration of a first peer network operatively connected to a second peer network via a local-area network (LAN) and/or a wide-area network (WAN) using TCP/IP and at least one IR device connected to the first peer network in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and other symbolic representations that directly or indirectly resemble an apparatus and a method for controlling a network-connected device in one peer network from an infrared device connected to another peer network using TCP/IP and infrared signals. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "peer network" is defined as a user-specific network comprising a set-top box operatively connected to an infrared (IR) device, one or more other devices locally connected to the set-top box, and a LAN and/or WAN network connecting the set-top box outside of the user-specific network.

Furthermore, for the purpose of describing the invention, a term "IR device" is defined as an electronic device locally connected to a set-top box, wherein the IR device connected to the set-top box is configured to initiate a command or a transfer of control and/or data from another set-top box or a device locally connected to another set-top box.

In addition, for the purpose of describing the invention, a term "wide-area network" (WAN) is defined as a communications network defining a broad geographic area or a broad number of network equipment and connected devices. An example of a wide-area network (WAN) is the Internet.

Moreover, for the purpose of describing the invention, a term "local-area network" (LAN) is defined as a smaller-scale communications network covering a localized region such as home, office, or a building. In one example, a plurality of networked devices and computers can be connected to the local-area network (LAN). A local-area network can be connected to a wide-area network (WAN), typically with a network gateway to provide a network compatibility between the LAN and the WAN. In one example of local-area network, a series of Internet Protocol (IP) addresses (i.e. 192.161.0.xxx) are specifically designated to represent local-area network (LAN) connections.

Furthermore, for the purpose of describing the invention, a term "interoperable network" is defined as a compatible network encompassing a LAN, a WAN, a Personal-Area Network such as Bluetooth or RFID, an AC-modulated home network, and/or a closed-circuit private network (e.g. a security camera network) for compatible device communications among networked devices.

In addition, for the purpose of describing the invention, a term "most-appropriate" device is defined as an electronic device in a particular peer network, wherein the "most-appropriate" device is intelligently determined or estimated to be a best matching device for utilizing incoming data received by a set-top box of the particular network. The "most-appropriate" device is an ultimate recipient of the incoming data received and analyzed by the set-top box which uses an intelligent routing methodology as described in the specification.

Continuing with definition of the terms used for the purpose of describing the invention, a term "device state and location server" (DSLS) is defined as a computer server configured to poll, receive, record, or transmit information from a networked device, wherein the computer server is an intermediate server managing, updating, or brokering at least some information between the networked device and a commanding device. In one embodiment of the invention, the DSLS records, updates, or transmits current activity status of a networked device to a commanding device when the networked device sends a beacon to the DSLS. In a preferred embodiment of the invention, the commanding device is an IR device locally connected to a first set-top box comprising a first peer network, and the networked device is a locally-connected device to a second set-top box comprising a second peer network, wherein the first and the second peer networks are operatively connected by TCP/IP. In another embodiment of the invention, the DSLS records, updates, or transmits current activity status of a networked device in a second peer network to a commanding device (i.e. IR device) connected to a first set-top box in a first peer network, when the DSLS or a user interface program on the commanding device polls information from the networked device of a second peer network.

In general, embodiments of the invention relate to monitoring, controlling, and transferring data from one electronic device to another electronic device in one or more networks. More specifically, the invention relates to an apparatus and a method for controlling a network-connected device in a peer network from an infrared device connected to another peer network using TCP/IP and infrared (IR) signals.

One objective of the invention is to provide a seamlessly-compatible transfer of control of a networked device in one peer network to another peer network using TCP/IP and an IR device initiating the transfer of control, regardless of distance and underlying network configurations between the two peer networks. Yet another objective of the invention is to provide an apparatus and a method to transfer, share, and control networked devices and their related device between peer networks operatively connected via a variety of communication networks, or an interoperable network (i.e. a PAN, a LAN, a WAN, and etc.) by using an IR device initiating and receiving requested control and/or data.

Furthermore, another objective of the invention is to provide an intelligent routing of transferred data from a data-transferring peer network to a data-receiving peer network when requested data is received by a set-top box of the data-receiving peer network, wherein the intelligent routing involves a data packet header analysis and/or payload content examination from the set-top box of the data receiving peer network to send the data packet automatically to a device locally connected to the set-top box of the data-receiving network.

In addition, another objective of the invention is to use a Secure Socket Layer (SSL) in a Transport Control Protocol (TCP) to provide a secure connection between a first set-top box and a second set-top box, wherein each set-top box is wirelessly connected to an IR device configured to receive and send data or commands. An example of an IR device is a security camera, a DVD-player, or a liquid crystal display remote controller operatively connected to a set-top box using an IR protocol such as IrDA and optionally using a radio frequency (RF)-based wireless local area network protocol such as the IEEE 802.11 "WiFi" technology FIG. 1 shows a conceptual network configuration (100) of a first peer network (101) operatively connected to a second peer network (109) via a local-area network (LAN) and/or a wide-area network (WAN) (131) using TCP/IP and at least one IR device (105) connected to the first peer network (101) in accordance with an embodiment of the invention.

In a preferred embodiment of the invention, the first peer network (101) comprises a first set-top box (STB 1) (103), an IR device 1 (105), and an optionally-connected device 1 (107). The IR device 1(105) is wirelessly connected to the STB 1 (103) using an infrared (IR) data transfer protocol such as IrDA and optionally using a radio frequency (RF)-based wireless local area network protocol such as the IEEE 802.11 "WiFi" technology. Furthermore, the IR device 1 (105) is typically a commanding device configured to request a control of other networked devices, wherein an initial step of the request is made via an infrared (IR) data transfer protocol. In one embodiment of the invention, the IR device 1 (105) is a multiple network device controller with an LCD screen which updates the current status of each connected or controlled device by the IR device 1 (105). Such updates may occur either by an IR data transfer protocol or an RF-based wireless local area network protocol.

In a preferred embodiment of the invention, the IR device 1 (105) sends a request to control a particular networked device using an IR data transfer protocol to the STB 1 (103), which in turn transmits the request to a relevant destination using TCP/IP via a LAN and/or a WAN (131). If the request to control the particular network device involves downloading some data from the particular network device from the second peer network (109), then the STB 1 (103) can download data from the particular network device in the second peer network (109) via the LAN and/or the WAN (131) connection and then relay the received data to the IR device 1 (105).

However, if the IR device 1 (105) requests a transfer of a substantial amount of data from the particular networked device to the IR device 1 (105) itself, then the transfer of the substantial amount of data (e.g. multimedia data) from the STB 1 (103) to the IR device 1 (105) may occur using an RF-based wireless local area network protocol such as an IEEE 802.11 derivative (e.g. IEEE 802.11g, 802.11b, and etc.). In the preferred embodiment of the invention, the IR device 1 (105) is also a digital multimedia player capable of requesting multimedia data from a networked device of another peer network and downloading the multimedia data to the IR device 1 (105) itself via the STB 1 (103), wherein the multimedia data relayed from the STB 1 (103) to the IR device 1 (105) may use an RF wireless local area network protocol such as IEEE 802.11 instead of using the IR data transfer protocol which may place excessive line-of-sight limitations during the transfer of the multimedia data from the STB 1 (103) to the IR device 1 (105).

The conceptual network configuration for the first peer network (101) of the invention also includes an optionally-connected device 1 (107). Although a core "peer" network for the first peer network (101), at a bare-bone level, can simply comprise the STB 1 (103) and the IR device 1 (105), one or more locally networked devices (e.g. 107) are typically also connected to the STB 1 (103) as part of a realistic implementation of a peer network. Examples of optionally-connected local network devices include home network appliances such as a security system, a computer, a camcorder, a television, a DVD player, an Internet-capable refrigerator, and/or any electronic devices that can be connected to a communications network.

Furthermore, incoming data (e.g. multimedia data) requested by the IR device 1 (105) from a network device (e.g. 111, 113, 115) connected to the second peer network (109) may be intelligently routed by the STB 1 (103) to a most-appropriate optionally-connected device (e.g. 107) within the first peer network (101) instead of being downloaded to the IR device 1 (105) itself. For example, if the optionally-connected device 1 (107) is a television and the incoming data comprises video data, then the incoming data can be automatically and intelligently routed to the television, instead of being transmitted to the IR device 1 (205) which originally requested the incoming data from the second peer network (109), because the STB 1(103) can be configured to conduct a data packet header analysis and/or data packet payload content examination to determine a most-appropriate device for reception of the incoming data. In one embodiment of the invention, the determination of "the most-appropriate device" for reception of the incoming data may be implemented with a multi-bit "peer network local device identifier" in a data packet header. The peer network local device identifier specifies a particular device within a peer network which enables the incoming data to be intelligently and automatically routed from a set-top box that received the incoming data to the particular device within the peer network. In another embodiment of the invention, a set-top box (e.g. STB 1 (103)) receiving incoming data from another peer network may incorporate an elaborate algorithm to analyze data packet payload content patterns and characteristics to formulate an educated "best guess" for routing the incoming data to a "most-appropriate" device locally-connected to the set-top box (e.g. STB 1(103)).

For example, if there is an additional optionally-connected device other than the STB 1 (103), the IR device 1 (105), and the optionally-connected device 1 (107) in the first peer network (101), and the additional optionally-connected device is an Internet-capable refrigerator with a display screen, then the STB 1 (103) header analysis and/or data packet payload content examination can determine whether incoming data from the second peer network (109) is a cooking recipe configured to be displayed with a voice narration on the Internet-capable refrigerator. In one instance of this example, a multi-bit peer network local device identifier is assigned to each locally-connected device within the peer network (e.g. the STB 1 (103), the IR device 1 (105), the optionally-connected device 1 (107), and the Internet-capable refrigerator) and a data packet header includes a multi-bit peer network local device identifier so that a set-top box can readily identify where to route the incoming data within the peer network by matching the multi-bit particular peer network local device identifiers. In another instance of this example, the set-top box (e.g. STB 1 (103)) incorporates an elaborate algorithm to analyze incoming data packet payload content patterns and characteristics to identify a cooking recipe configured to be displayed with a voice narration. If the elaborate algorithm generates an educated "best guess" that the data packet payload is definitively or likely to be the cooking recipe configured to be displayed with a voice narration, then the incoming data containing the cooking recipe is routed to a "most-appropriate" device locally connected to the set-top box (e.g. STB 1(103)), which happens to be the Internet-capable refrigerator with the display screen, and not other locally-connected devices.

Continuing with FIG. 1, the STB 1(103) of the first peer network (101) is operatively connected (121) to the LAN and/or the WAN (131) via TCP/IP. The second peer network (109) comprises a second set-top box (STB 2) (111) operatively connected (125) to the LAN and/or the WAN (131) via TCP/IP, an IR device 2 (113) locally networked to the STB 2 (111), and an optionally-connected device 2 (115) also locally networked (129) to the STB 2 (111).

In a preferred embodiment of the invention, the IR device 1 (105) is configured to request a control of the STB 2 (111) or one or more devices locally connected (e.g. 113, 115) to the STB 2 (111) by sending the request using infrared signals to communicate with the STB 1(103), which in turn transmits the request to the STB 2 (111) via the LAN and/or the WAN (131). In one embodiment of the invention, a Transport Control Protocol (TCP) in a transport-level layer can be used to send the request from the STB 1(103) to the STB 2 (111). The TCP may also utilize a Secure Socket Layer (SSL) to provide security to specific content of the communication between the STB 1(103) and the STB 2 (111). The STB 2 (111) may send an acknowledgement or denial signal using the TCP to confirm or deny the request from STB 1(103). The STB 2 (111) may also send a stream of multimedia data, typically by utilizing internet protocol (IP) network layer which is a lower network-level layer than the transport-level layer. If the IR device 1 (105) and the STB 1(103) are successfully authenticated and authorized to control and/or access the second peer network (109) through the STB 2 (111), then the IR device 1 (105) can send signals to control certain functions of the STB 2 (111) or certain functions of a device (e.g. 113, 115) locally networked to STB 2 (111).

Depending on a type of the device locally connected to STB 2 (111), the IR device 1 (105) can also upload data to or download data from the device (e.g. 113, 115) locally connected to STB 2 (111). For example if the optionally-connected device 2 (115) is a movie data storage, then the IR device 1 (105) can initiate downloading of a movie from the movie data storage using a movie list information first downloaded to the IR device 1 (105) or the STB 1 (103), from which a particular movie may be selected for downloading streaming multimedia data. In one embodiment of the invention, the downloaded movie from the second peer network (109) to the first peer network (101) can be intelligently routed by the STB 1 (103) for a particular device within the first peer network (101) (e.g. the optionally-connected device 1 (107), the IR device 1 (105), and/or another network device connected to the first peer network (101)) within the first peer network (101). In a preferred embodiment of the invention, intelligent routing of downloaded data is achieved by incoming packet header and/or packet payload content examination, from which the STB 1 (103) can determine where to route the incoming downloaded data within the first peer network (101).

Continuing with FIG. 1, other devices (e.g. "optionally-connected device 3" (117), "optionally-connected device 4" (119)) outside the first peer network (101) and the second peer network (109) can also be accessed, controlled, and/or utilized by the first peer network (101) if they are connected (e.g. 123, 127) to the LAN and/or the WAN (131), as shown in FIG. 1. Examples of other devices outside the first peer network (101) and the second peer network (109) include a network attached storage (NAS) and a device state and location server (DSLS).

Figure 2:
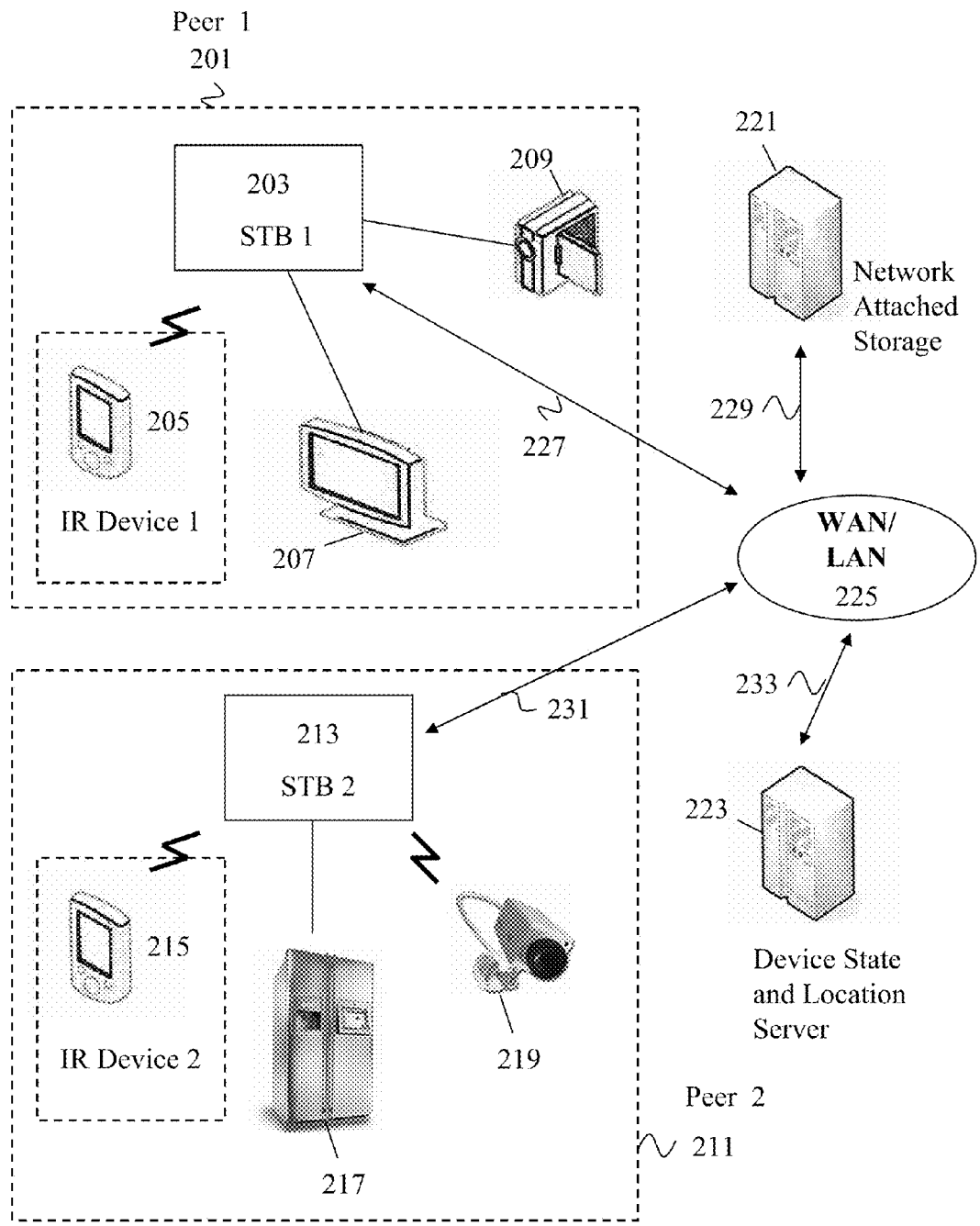
FIG. 2 shows a realistic example of a conceptual network configuration of a first peer network operatively connected to a second peer network using a LAN or a WAN using TCP/IP and at least one IR device connected to the first peer network in accordance with an embodiment of the invention.

FIG. 2 shows a realistic example of a conceptual network configuration (200) of a first peer network (201) operatively connected (e.g. 227, 231) to a second peer network (211) via a LAN or a WAN (225) using TCP/IP and at least one IR device (205) connected to the first peer network (201) in accordance with an embodiment of the invention.

In a preferred embodiment of the invention, the first peer network (201) comprises a first set-top box (STB 1) (203), an IR device 1 (105), a television (207), and a camcorder (209). In the preferred embodiment of the invention, the IR device 1 (205) is wirelessly and locally networked to the STB 1 (203) by using an infrared data transfer protocol such as IrDA. In some implementations of the invention, the IR device 1 (205) can also use a radio frequency (RF)-based wireless local area network protocol such as the IEEE 802.11 "WiFi" technology. Furthermore, the IR device 1 (205) is typically a commanding device configured to request a control of other networked devices, wherein an initial step of the request is made via an IR data transfer protocol. In one embodiment of the invention, the IR device 1 (205) is a multiple network device controller with an LCD screen which updates the current status of each connected device optionally configured to be controlled by the IR device 1 (205). Such updates may occur either by an IR data transfer protocol or an RF-based wireless local area network protocol.

In a preferred embodiment of the invention, the IR device 1 (205) can send a request to control a particular networked device (e.g. 215, 217, or 219) in the second peer network (211) by using an IR data transfer protocol to the STB 1 (203), which in turn transmits the request to a second set-top box (STB 2) by using TCP/IP via a LAN and/or a WAN (225). If the request to control the particular network device involves downloading some data from the particular network device from the second peer network (211), then the STB 1 (203) can download the data from the particular network device in the second peer network (211) via the LAN and/or the WAN (225) connection and then relay the received data to the IR device 1 (205).

However, if the IR device 1 (205) requests a transfer of a substantial amount of data from the particular networked device (e.g. 213, 215, 217, or 219) to the IR device 1 (205) itself, then the transfer of the substantial amount of data (e.g. multimedia data) to the IR device 1 (205) from the STB 1 (203) may occur using an RF-based wireless local area network protocol such as an IEEE 802.11 derivative (e.g. IEEE 802.11g, 802.11b, and etc.). In the preferred embodiment of the invention, the IR device 1 (205) is also a digital multimedia player capable of requesting multimedia data from a networked device of another peer network and downloading the multimedia data to the IR device 1 (205) itself via the STB 1 (203), wherein the multimedia data relayed from the STB 1 (203) to the IR device 1 (205) may use an RF wireless local area network protocol such as IEEE 802.11 instead of using the IR data transfer protocol which may place excessive line-of-sight limitations during the transfer of the multimedia data from the STB 1 (203) to the IR device 1 (205).

Furthermore, the multimedia data requested by the IR device 1 (205) from a network device (e.g. 213, 215, 217, or 219) connected to the second peer network (211) may be intelligently routed by the STB 1 (203) to a "most-appropriate" optionally-connected device (e.g. 207, 209) within the first peer network (201) instead of being downloaded to the IR device 1 (105) itself. For example, in one embodiment of the invention, a television (207) locally connected to the STB 1 (203) can automatically receive the multimedia data which were initially requested by the IR device 1 (205). The multimedia data can be intelligently routed to the television (207) because the STB 1(203) can have packet header analysis or payload content examination capabilities for automated routing of the multimedia data.

In one embodiment of the invention, the determination of "the most-appropriate device" for reception of incoming data may be implemented with a multi-bit "peer network local device identifier" in a data packet header. The peer network local device identifier specifies a particular device within a peer network which enables the incoming data to be intelligently and automatically routed from a set-top box that received the incoming data to the particular device within the peer network. In another embodiment of the invention, a set-top box (e.g. STB 1 (203)) receiving incoming data from another peer network may incorporate an elaborate algorithm to analyze data packet payload content patterns and characteristics to formulate an educated "best guess" for routing the incoming data to a "most-appropriate" device (e.g. 205, 207, 209, and etc.) locally-connected to the set-top box (e.g. STB 1(203)).

The conceptual network configuration for the first peer network (201) of the invention also includes a television (207) and the a camcorder (209). Although a core "peer" network for the first peer network (201) at a bare-bone level can simply comprise the STB 1(203) and the IR device 1 (205), one or more networked devices (e.g. the television (207), the camcorder(209)) are typically also connected to the STB 1(203) as part of a realistic implementation of a peer network.

Continuing with FIG. 2, the STB 1(203) of the first peer network (201) is operatively connected (227) to the LAN and/or the WAN (225) via TCP/IP. The second peer network (211) comprises a second set-top box (STB 2) (213) operatively connected (231) to the LAN and/or the WAN (225) via TCP/IP, an IR device 2 (215) locally networked to the STB 2 (213), a refrigerator (217) locally networked to the STB 2 (213), and a security camera (219) which is also locally networked to the STB 2 (213).

In a preferred embodiment of the invention, the IR device 1 (205) is configured to request a control of the STB 2 (213), the refrigerator (217), the security camera (219), and/or the IR device 2 (215) by sending the request using infrared signals to communicate with the STB 1(203), which in turn transmits the request to the STB 2 (213) via the LAN and/or the WAN (225). In one embodiment of the invention, a Transport Control Protocol (TCP) in a transport-level layer can be used to send the request from the STB 1(203) to the STB 2 (213). The TCP may also utilize a Secure Socket Layer (SSL) to provide security to specific content of the communication between the STB 1(203) and the STB 2 (213). The STB 2 (213) may send an acknowledgement or denial signal using the TCP to confirm or deny the request from STB 1(203). The STB 2 (213) may also send a stream of multimedia data to the STB 1 (203) upon request and authorization. In one embodiment of the invention, the stream of multimedia data is transmitted typically by utilizing an internet protocol (IP) network layer which is a lower network-level layer than the transport layer. If the IR device 1 (205) and the STB 1(203) are successfully authenticated and authorized to control and/or access the second peer network (211) through the STB 2 (213), then the IR device 1 (205) can send signals to control certain functions of the STB 2 (213) or certain functions of the refrigerator (217), the security camera (219), and/or the IR device 2 (215).

In one embodiment of the invention, the security camera (219) may be locally connected to the STB 2 (213) by TCP/IP using a secure socket layer (SSL), or locally connected to the STB 2 (213) as a secure and dedicated private network. The refrigerator (217) may also be locally connected to the STB 2 (213) by TCP/IP or simply by an AC-modulated protocol such as X.25. On the other hand, the IR device 2 (215) may be configured to communicate locally with the STB 2 (213) if the IR device 2 (215) uses an IR data transfer protocol and is within a line of sight from the STB 2 (213). Alternatively, the IR device 2 (215) may use an RF-based wireless network protocol such as IEEE 802.11 to communicate with the STB 2 (213) while using the IR data transfer protocol to transfer a user-initiated command from the second peer network (211). Regardless of underlying communication methods and protocols used in the first peer network (201) and the second peer network (211), the compatible usage of TCP/IP for requesting, transferring, and controlling devices and data between the STB 1(203) and the STB 2 (213) enable a seamless communication between the two peer networks (i.e. 201, 211).

In a preferred embodiment of the invention, the IR device 1 (205) can also initiate an uploading or a downloading of data from the refrigerator (217), the security camera (219), or the IR device 2 (215) which are locally connected to the STB 2 (213). For example, a stream of video data captured by the security camera (219) and stored in a buffer of the STB 2 (213) in the second peer network (211) can be transmitted in near real-time to the STB 1(203) of the first peer network (201), if a user triggers a video data transfer command from the IR device 1 (205). In one embodiment of the invention, the stream of video data received by the STB 1 (203) can be transmitted to the IR device 1 (205) itself by typically using an RF-based wireless local area network protocol such as IEEE 802.11. In another embodiment of the invention, the stream of video data received by the STB 1(203) can be intelligently and automatically routed to another networked device (e.g. 207, 209) within the first peer network (201) based on incoming packet header and/or packet payload content examination performed by the STB 1 (203), which can determine where to route the incoming downloaded data within the first peer network (201).

For instance, if the incoming packet header and/or packet payload content examination by the STB 1(203) indicates live video data from the security camera (219), then the STB 1(203) may decide to route the live video data feed to the television (207). In contrast, if the incoming packet header and/or packet payload content examination by the STB 1(203) indicates device status information of the security camera (219), then the STB 1(203) may decide to route the device status information of the security camera (219) to a device state and location server (e.g. 223) or the IR device 1 (205) which may keep track of the device status of the security camera (219).

In another example, the IR device 1 (205) can upload a new temperature setting to the refrigerator (217) or a recipe to an LCD screen of the refrigerator (217) in the second peer network (211) by requesting a permission to control or access the refrigerator to the STB 2 (213), which connects to the refrigerator (217) by using a protocol that may be unknown to the first peer network (201). Therefore, even though a device (e.g. 217) itself may be connected to the STB 2 (213) using an unknown protocol (e.g. X.25) outside of the second peer network (211), the STB 1(203) and the IR device 1 (205) of the first peer network (201) can be still empowered to control the device of the second peer network (211) seamlessly with an initiation of a command from the IR device 1 (205).

Therefore, the peer-to-peer network compatibility provided via set-top boxes acting as network gateways regardless of underlying network protocols used for connecting local devices in each peer network is a significant advantage of the present invention. Furthermore, an infrared wireless communication device (e.g. 205) which can request a control of a particular device across different peer networks, regardless of the distance or underlying communication protocols used in a particular peer network for the particular device, is another major advantage of the present invention. Equally important, the intelligent routing of downloaded data by a set-top box (e.g. STB 1 (203)) to a most-appropriate device based on an incoming packet header and/or packet content examination is another major advantage of the present invention.

Continuing with FIG. 2, a network attached storage (NAS) (221) is operatively connected (229) to the LAN and/or the WAN (225) in a realistic example of the conceptual network configuration (200). In one embodiment of the invention, the NAS can be used as a storage for multimedia files such as video and music files which can be shared with one or more peer networks (201, 211). The IR device 1 (205) may also be configured to request access or control the NAS (221) after an authentication and/or an authorization process via STB 1 (203) connected to the LAN and/or the WAN (225).

Furthermore, the realistic example of the conceptual network configuration (200) also shows a device state and location server (DSLS) (223) operatively connected (233) to the LAN and/or the WAN (225). In one embodiment of the invention, the DSLS can be used as a server which maintains and periodically updates device state and location information for networked devices belonging to a variety of peer networks (e.g. 201, 211) and outside of peer networks. In a preferred embodiment of the invention, information stored in the DSLS can be used by the IR device 1 (205) to display some near real-time status information related to one or more networked devices, regardless of where and which network each device is connected to.

Figure 3:
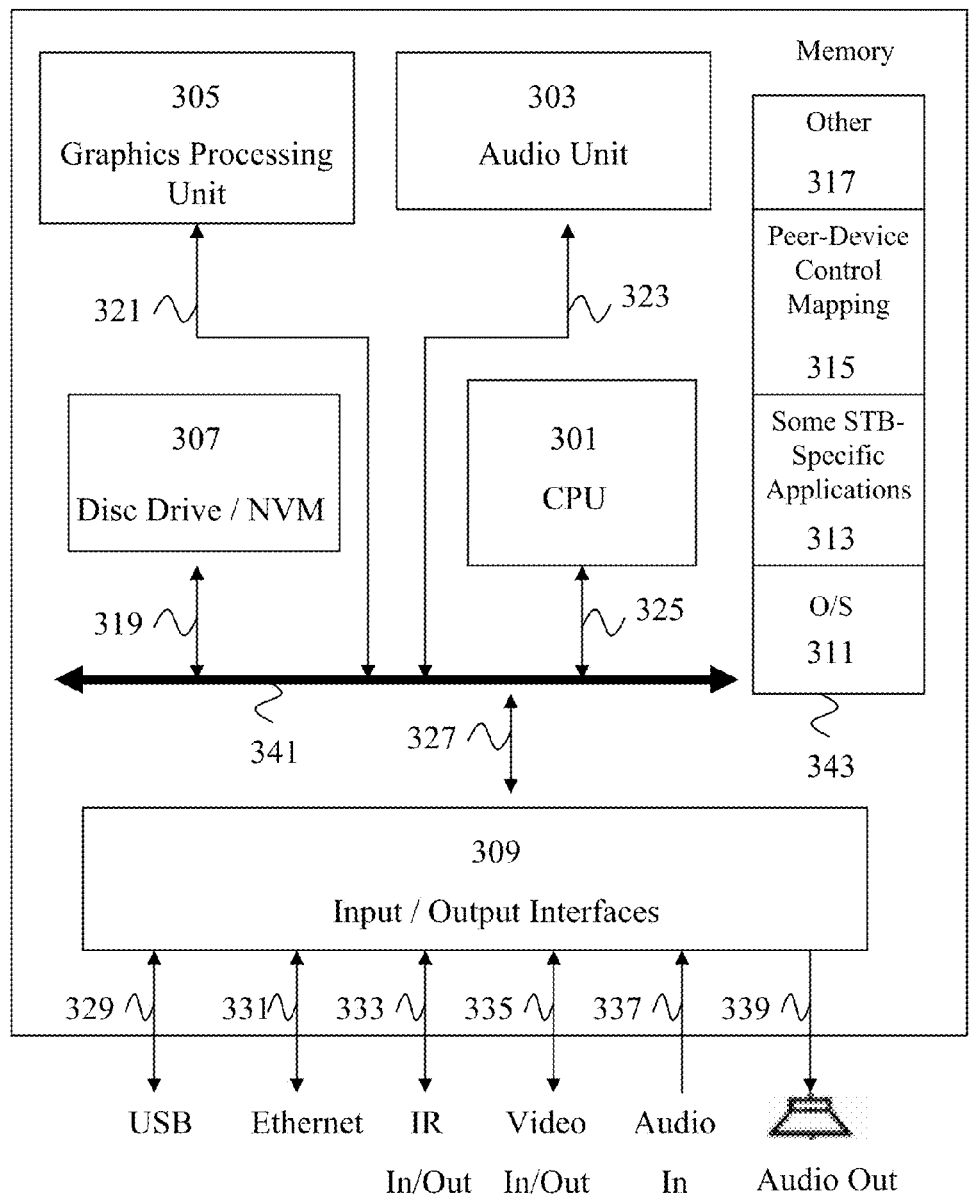
FIG. 3 shows an example of logic blocks in a set-top box, wherein the set-top box performs network gateway and device management functions for a particular peer network operatively connected to a LAN or a WAN.

FIG. 3 shows an example of logic blocks in a set-top box (300) (e.g. STB 1 (203), STB 2 (213) of FIG. 2), wherein the set-top box (300) performs network gateway and device management functions for a particular peer network operatively connected to a LAN or a WAN. In the example of the set-top box (300) in accordance with an invention, a CPU (301), which is typically a microprocessor or a microcontroller, is capable of executing major instructions, controlling other logic blocks in the set-top box (300), and managing a memory unit (343) and I/O interfaces (309). In one embodiment of the invention, the CPU is operatively connected (325) to a system bus (341), which is connected (e.g. 321, 323, 319, 327) to a plurality of logic blocks which may include an audio unit (303), a graphics processing unit (305), a storage unit (i.e. disk drive/non-volatile memory) (307), the memory unit (343), input/output interfaces (309), and any other relevant logic blocks in the set-top box (300).

In some implementations of the set-top box (300), the memory unit (343) may have a dedicated memory-to-CPU bus connection for a faster read and write time. Likewise, in some implementations of the set-top box (300), the graphics processing unit (305) may also have a dedicated graphics bus for a faster communication to the CPU and other relevant logic blocks. In one embodiment of the invention, the graphics processing unit (305) is responsible for tuning, demodulating, and/or generating graphic-related information which can be used by a display unit operatively connected to the set-top box (300). Furthermore, in one embodiment of the invention, the audio unit is responsible for encoding, decoding, compression, and/or decompression of audio-related data for the set-top box (300) which may be operatively connected to a sound-generating speaker through an "audio out" port (339).

Continuing with FIG. 3, in one embodiment of the invention, the storage unit (i.e. disk drive/non-volatile memory) (307) can store a variety of data from the memory unit (343), the CPU (301), the input/output interfaces (309), and other relevant logical blocks. In the preferred embodiment of the invention, the storage unit (i.e. disk drive/non-volatile memory) (307) is non-volatile in nature, which means that information stored in the storage unit (307) is retained even after a power is shut off for the set-top box (300). The storage unit (307) may comprise a hard disk drive, a flash (i.e. non-volatile) memory unit, or both. In contrast, the memory unit (343) typically comprises dynamic random access memory (DRAM) cells, which do not retain information after the power is shut-off.

The memory unit (343) of FIG. 3 shows some examples of contents in the memory, which are categorized as an "O/S" content (311), "some STB-specific applications" content (313), a "peer-device control mapping" content (315), and other contents (317). The O/S content (311) may include operating system-related information for the set-top box (300) in the memory unit (343). The O/S content (311) is generally not permitted to be modified by a remote device access or control. Likewise, some STB-specific applications content (313) in the memory unit (343) may include applications that are specific to the operating system of the set-top box (300) which should not be modified by a remote device access or control. In contrast, the peer-device control mapping content (315) contains transferable control and/or access information that can be used to share and/or transmit control of certain functions that are locally and natively managed by the set-top box (300). Furthermore, the memory unit (343) may also contain any other contents (317) related to the set-top box (300).

Continuing with FIG. 3, the input/output interfaces (309) are connected (327) to the system bus (341) and are configured to receive and transmit data. For example, a USB port (329) provides a bidirectional peripheral interface for connection of the set-top box (300) with any USB-enabled device. A Ethernet port (331) also provides a method of a LAN and/or a WAN network connection for the set-top box (300). In addition, an infrared (IR) data in/out port (333) can be used for line-of-sight data transfer applications such as an IR device functioning as a master device controller for a variety of networked devices in numerous peer networks. In one embodiment of the invention, the IR data in/out port (333) is actually two separate ports: an IR input port and an IR output port. In another embodiment of the invention, the IR data in/out port (333) is a combined, single bidirectional input/output port. Furthermore, an "video in/out" port (335) can be used as an input and/or an output port for video sources (e.g. using an RCA cable, a copper cable, or a digital multi-pin interface). In one embodiment of the invention, the video in/out port (335) is actually two separate ports: a video input port and a video output port. In another embodiment of the invention, the video in/out port (335) is a combined, single bidirectional input/output port. Furthermore, the video in/out port (335) may carry digital video signals (e.g. MPEG, WMV) or analog video signals depending on a specific design of the set-top box (300).

Moreover, for the set-top box (300), an "audio in" port (337) is configured to receive either digital or analog audio data, depending on a specific design of the "audio in" port (337). For example, if the "audio in" port is digital, then a digital-to-analog conversion and a subsequent signal amplification may be necessary to play received audio data to a speaker. On the other hand, if the "audio in" port (337) is analog, then only an analog-based amplification with some filtering may be necessary to play the received audio data through the speaker. Furthermore, an "audio out" port (339) can be operatively connected to a speaker or a sound amplifier for reproduction of audio from the set-top box (300).

Figure 4:
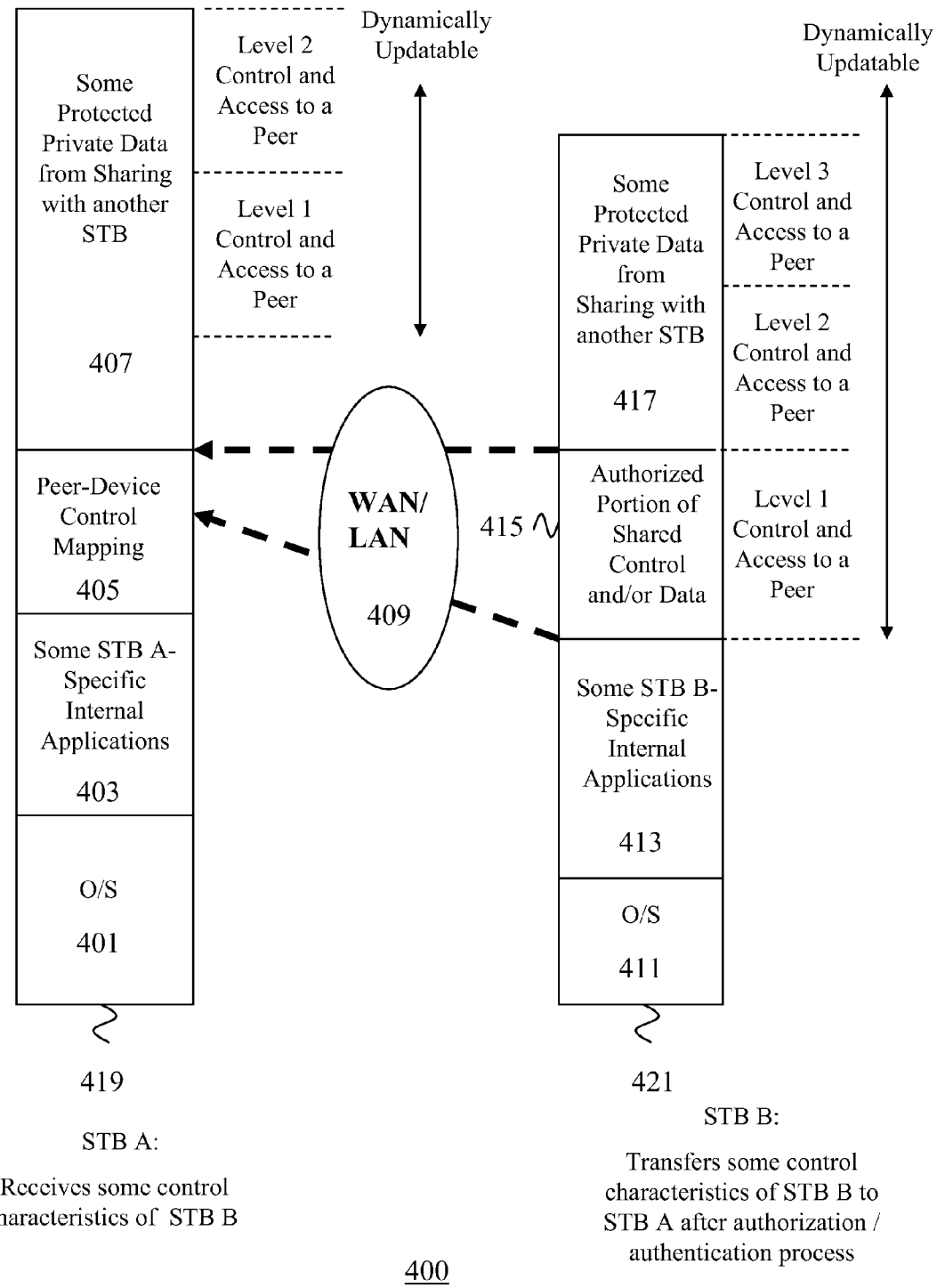
FIG. 4 shows an example of a multi-level transfer or sharing of device control and management between a first peer network and a second peer network in accordance with an embodiment of the invention.

FIG. 4 shows an example (400) of a multi-level transfer or sharing of device control and management between a set-top box "A" (STB A) in a first peer network and a set-top box "B" (STB B) in a second peer network which are operatively connected by a LAN and/or a WAN (409) in accordance with an embodiment of the invention. A conceptual memory diagram (419) for the STB A contains an "O/S" content (401) for the STB A, "some STB A-specific internal applications" content (403), a "peer-device control mapping" content (405) for STB A, and some protected private data content (407) from a peer access level-based sharing with another set-top box for STB A. The O/S content (401) for the STB A may include operating system-related information for the STB A. The O/S content (401) is generally not permitted to be modified by a remote device access or control. Likewise, some STB A-specific internal applications content (403) in the conceptual memory diagram (419) may include applications that are specific to the operating system of the STB A which should not be modified by a remote device access or control. In contrast, the peer-device control mapping content (405) for the STB A contains transferred control information, access information, and/or data that have been previously managed by the set-top box B (STB B).

Similarly, a conceptual memory diagram (421) for the STB B contains an "O/S" content (411) for the STB B, "some STB B-specific internal applications" content (413), an "autho-rized portion of shared control and/or data" content (415) for STB B, and some protected private data content (417) from a peer access level-based sharing with another set-top box for STB B. The O/S content (411) for the STB B may include operating system-related information for the STB B. The O/S content (411) is generally not permitted to be modified by a remote device access or control. Likewise, some STB B-specific internal applications content (413) in the conceptual memory diagram (421) may include applications that are specific to the operating system of the STB B which should not be modified by a remote device access or control.

Continuing with FIG. 4, in one embodiment of the invention, the peer-device control mapping content (405) for the STB A contains some information related to an authorized portion of shared control and/or data (415) from the STB B, after the STB B gives the STB A an authorization to access and/or control the authorized portion of shared control and/or data (415). In one embodiment of the invention, the authorized portion from the STB B may only involve a limited level of control and access to another set-top box. In the example (400) of FIG. 4, only "Level 1" control and access are granted to the STB A, and other potentially "sharable" data contained in "Level 2" and "Level 3" of the conceptual memory diagram (421) for the STB B remain as protected private data from sharing (417) with the STB A. In a preferred embodiment of the invention, contents of the conceptual memory diagrams (i.e. 419, 421) can dynamically be updated, expanded, or reduced, as peer-to-peer network communications and their related requests, data/control sharing, and data/control transfer will dynamically change the contents of peer-device control mapping (e.g. 405) and authorized portion of shared control and/or data (e.g. 415). It is also important to note that the example (400) in FIG. 4 is merely one example of conceptual memory diagrams related to the present invention and by no means limits scope or configuration of the invention just to the example (400) of FIG. 4.

Figure 5:
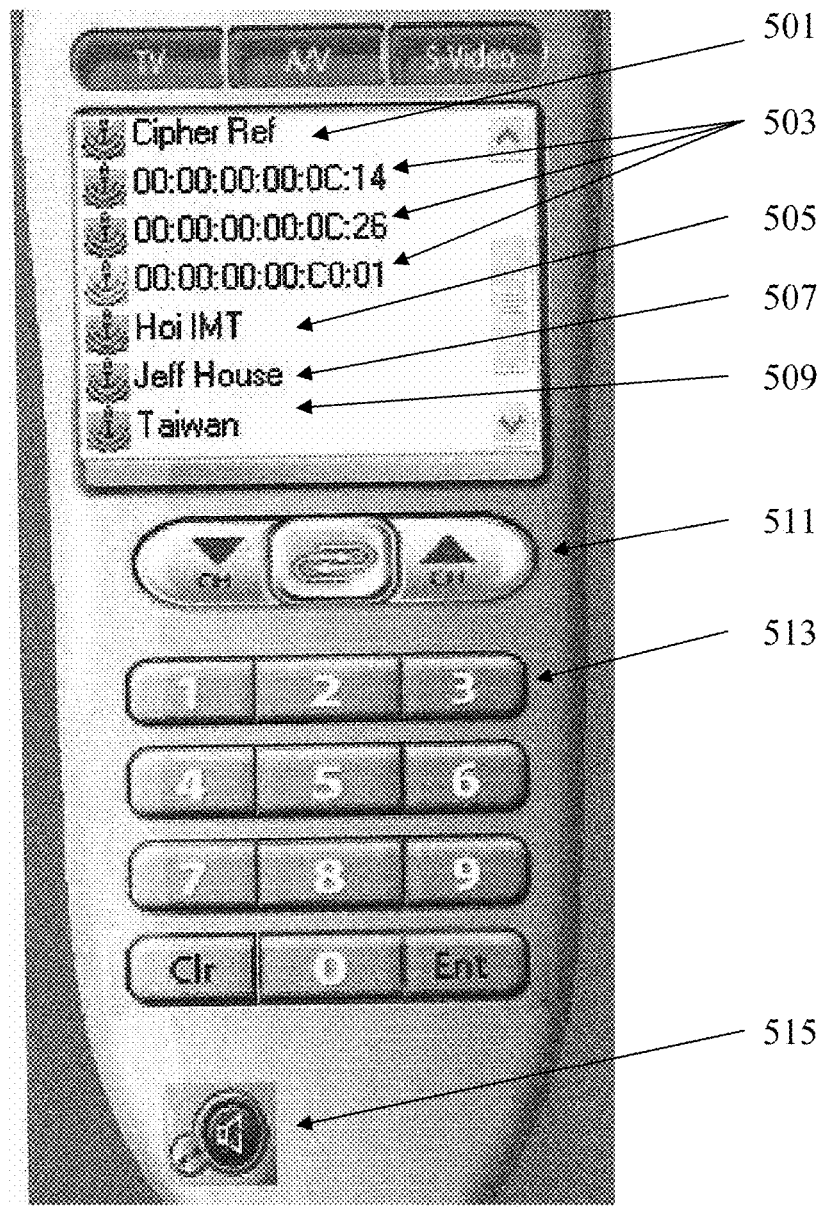
FIG. 5 shows an example of an IR device connected to a first set-top box in a first peer network, which is operatively connected to a second set-top box in a second peer network via TCP/IP in a LAN and/or a WAN, in accordance with an embodiment of the invention.

FIG. 5 shows an example of an IR device (500) connected to a first set-top box in a first peer network, which is operatively connected to a second set-top box in a second peer network via TCP/IP in a LAN and/or a WAN, in accordance with an embodiment of the invention. In a preferred embodiment of the invention, the IR device (500) is a IR device configured with an LCD screen and input keypads to monitor and control networked devices in a local-area network (LAN) and a wide-area network (WAN) simultaneously.

In the preferred embodiment of the invention, a plurality of registered icons and icon names (501, 505, 507, and 509) symbolize networked devices which may have been tracked individually by the IR device (500), or tracked by a third party resource such as a DSLS. A plurality of unknown or unregistered devices are also shown in FIG. 5 as unnamed icons (503). In one embodiment of the invention, the IR device (500) also has a channel control (511) for changing video or audio channels of a networked device, if the networked device is a multimedia device. In one embodiment of the invention, the IR device (500) also contains a numerical keypad (513) and a speaker enable/disable button (515) for user convenience. It should be noted that the channel control (511), the numerical keypad (513), and the speaker enable/disable button (515) are merely optional and do not limit the scope of the novelty of the IR device (500) for providing a single universal user interface for monitoring and controlling all WAN and LAN-connected and registered devices for a particular user.

In one embodiment of the invention, a shape of an icon can distinguish one type of networked device (e.g. a camcorder) from another type of networked device (e.g. a refrigerator). The shape of an icon can also differentiate one peer network from another, and the IR device (500) may have control and/or access rights across different peer networks even though it is only locally directly connected to a set-top box. Furthermore, in one embodiment of the invention, a color coding scheme of an icon representing a networked device indicates a current activity status of the networked device. For example, if the networked device is in a "device busy" mode, the color coding for the icon may be red. If the networked device is in a "device online" mode or a "device available" mode, the color coding for the icon may be green. Moreover, if the networked device is in a "device offline" mode, the color coding for the icon may be gray. The color coding scheme for indicating current activity status of each registered networked device is a unique aspect of the present invention. The color coding scheme for networked device icons enables a user to glance at the IR device (500) for a quick, intuitive monitoring of all registered networked devices.

Continuing with FIG. 5, if a user needs a direct connection to a particular networked device called "Jeff House" (507) beyond passive monitoring information provided by the DSLS (223) of FIG. 2, then the user can invoke the direction connection to the particular networked device (507) by taking actions such as double-clicking on an icon or an icon name in the IR device (300) for the particular networked device (507).

A major advantage of the IR device (500) in accordance with an embodiment of the invention is that a user can monitor all networked devices in a LAN and a WAN in a centralized and coherent user interface (e.g. 500), instead of using a plurality of device-specific management software to monitor and control a variety of networked devices. The IR device (500) of FIG. 5 significantly reduces information processing burden from the user while providing an intuitive and rapid monitoring capability of networked devices in a single user interface screen.

Figure 6:
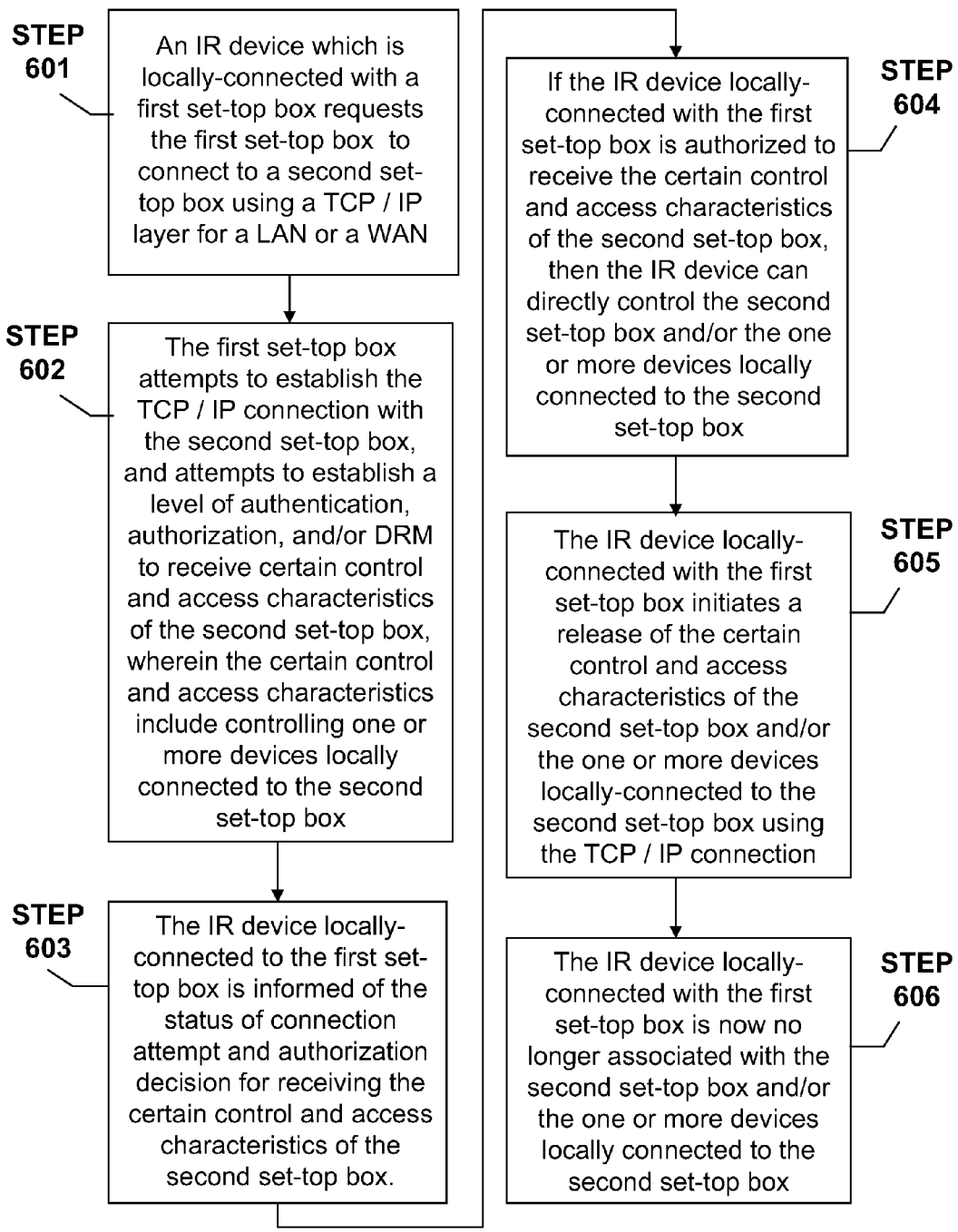
FIG. 6 shows a method for controlling a network-connected device in a second peer network from an infrared (IR) device connected to a first peer network, wherein the first peer network and the second peer network are connected via TCP/IP in a LAN and/or a WAN, in accordance with an embodiment of the invention.

FIG. 6 shows a method for controlling a network-connected device in a second peer network from an infrared (IR) device connected to a first peer network, wherein the first peer network and the second peer network are connected via TCP/IP in a LAN and/or a WAN, in accordance with an embodiment of the invention. In STEP 601 of FIG. 6, an IR device locally-connected with a first set-top box comprises the first peer network, and the IR device requests the first set-top box to connect to a second set-top box in the second peer network using TCP/IP layers in a LAN or a WAN. In STEP 602, the first set-top box attempts to establish the TCP/IP connection with the second set-top box, and attempts to establish a level of authentication, authorization, and/or digital rights management (DRM) to receive certain control and access characteristics of the second set-top box, wherein the certain control and access characteristics include controlling one or more devices locally connected to the second set-top box.

Then, in STEP 603, the IR device to the first set-top box is informed of the status of connection attempt and authorization decision for receiving the certain control and access characteristics of the second set-top box. Subsequently, in STEP 604, if the IR device locally-connected with the first set-top box is authorized to receive the certain control and access characteristics of the second set-top box, then the IR device can directly control the second set-top box and/or the one or more devices locally connected to the second set-top box.

Continuing with FIG. 6, if a user using the IR device wants to disconnect from a device belonging to the second peer network, then the IR device locally-connected with the first set-top box initiates a release of the certain control and access characteristics of the second set-top box and/or the one or more devices locally-connected to the second set-top box using the TCP/IP connection, as shown in STEP 605. Lastly, in STEP 606, once the release of the certain control and access characteristics of the second set-top box is complete, the IR device locally-connected with the first set-top box is now no longer associated with the second set-top box and/or the one or more devices locally connected to the second set-top box.

Figure 7:
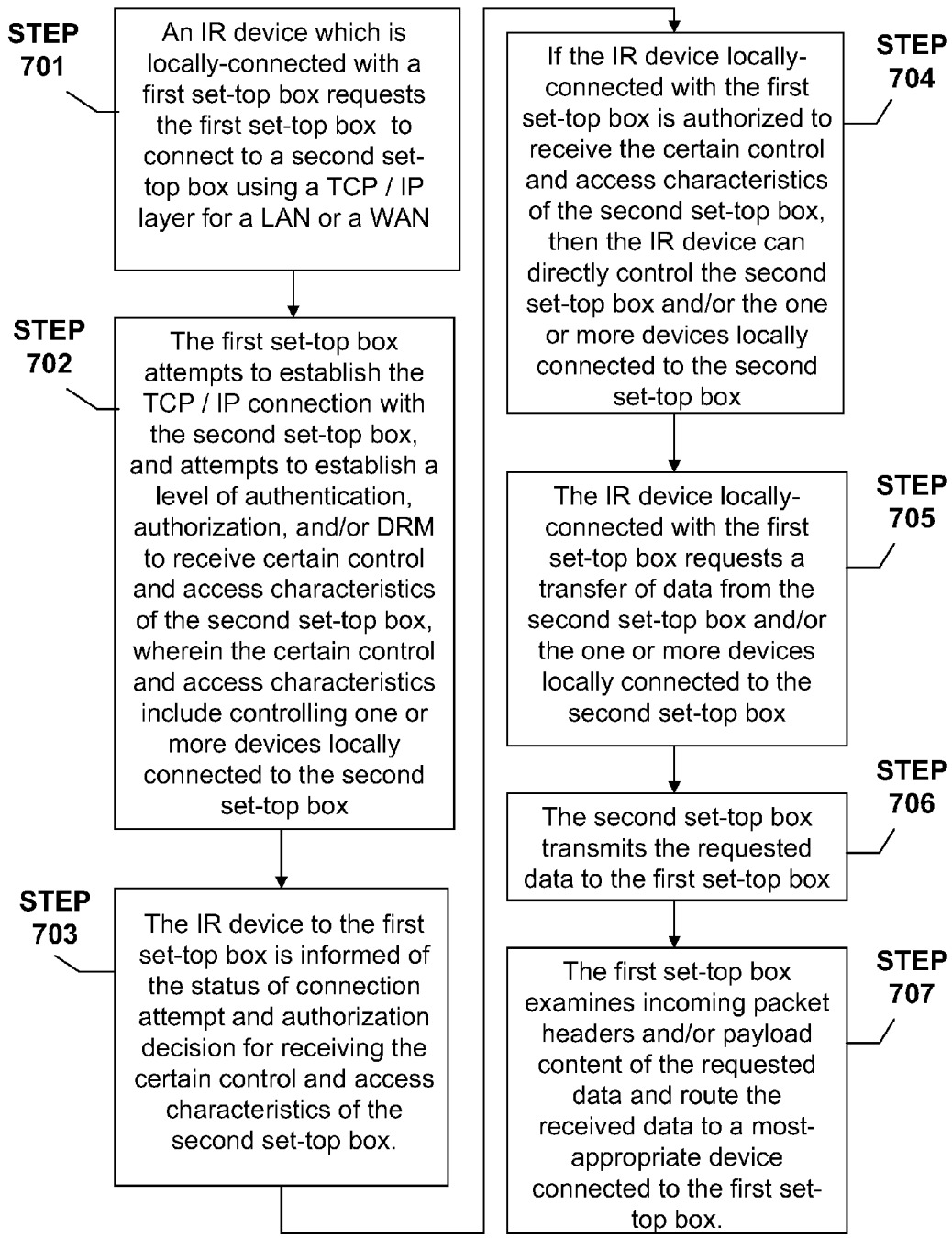
FIG. 7 shows a method for intelligently routing transferred data from a network-connected device in a second peer network to a set-top box in a first peer network in accordance with an embodiment of the invention.

FIG. 7 shows a method (700) for intelligently routing transferred data from a network-connected device in a second peer network to a set-top box in a first peer network in accordance with an embodiment of the invention. In STEP 701 of FIG. 7, an IR device locally-connected with a first set-top box comprises the first peer network, and the IR device requests the first set-top box to connect to a second set-top box in the second peer network using TCP/IP layers in a LAN or a WAN. In STEP 702, the first set-top box attempts to establish the TCP/IP connection with the second set-top box, and attempts to establish a level of authentication, authorization, and/or digital rights management (DRM) to receive certain control and access characteristics of the second set-top box, wherein the certain control and access characteristics include controlling one or more devices locally connected to the second set-top box.

Then, in STEP 703, the IR device to the first set-top box is informed of the status of connection attempt and authorization decision for receiving the certain control and access characteristics of the second set-top box. Subsequently, in STEP 704, if the IR device locally-connected with the first set-top box is authorized to receive the certain control and access characteristics of the second set-top box, then the IR device can directly control the second set-top box and/or the one or more devices locally connected to the second set-top box.

Continuing with FIG. 7, now that the authorization to access the second set-top box is approved, the IR device locally connected with the first set-top box can request a transfer of data from the second set-top box and/or the one or more devices locally connected to the second set-top box as shown in STEP 705. In STEP 706, the second set-top box sends the first set-top box the requested data resident in the second set-top box or in the one or more devices locally connected to the second set-top box. In a preferred embodiment of the invention, the first set-top box can execute intelligent routing of incoming data packets as shown in STEP 707, wherein the intelligent routing means that the first set-top box is capable of examining incoming packet headers and/or packet payload content of the requested data to a most-appropriate device connected to the first set-top box.

In one embodiment of the invention, the determination of "the most-appropriate device" for reception of incoming data may be implemented with a multi-bit "peer network local device identifier" in a data packet header. The peer network local device identifier specifies a particular device within a peer network which enables the incoming data to be intelligently and automatically routed from a set-top box that received the incoming data to the particular device within the peer network. In another embodiment of the invention, a set-top box receiving incoming data from another peer network may incorporate an elaborate algorithm to analyze data packet payload content patterns and characteristics to formulate an educated "best guess" for routing the incoming data to a "most-appropriate" device locally-connected to the set-top box.

For instance, if the incoming packet header and/or packet payload content examination by the first set-top box indicates live video data from a security camera, the first set-top box may decide to route the live video data feed to a television or a video recorder. In contrast, if the incoming packet header and/or packet payload content examination by the first set-top box indicates device status information of the security camera, then the first set-top box may decide to route the device status information of the security camera to a device state and location server (DSLS) or an electronic device which may keep track of the device status information of the security camera.

The present invention provides several advantages to peer-to-peer network communications or interoperable network communications. One advantage is providing a seamlessly-compatible transfer of control of a networked device in one peer network to another peer network using TCP/IP and an IR device initiating the transfer of control, regardless of distance and underlying network configurations between the two peer networks. Another advantage of the invention is providing an apparatus and a method to transfer, share, and control networked devices and their related device between peer networks operatively connected via a variety of communication networks, or an interoperable network (i.e. a PAN, a LAN, a WAN, and etc.) by using an IR device initiating and receiving requested control and/or data.

Furthermore, another advantage of the present invention is providing an intelligent routing of transferred data from a data-transferring peer network to a data-receiving peer network when requested data is received by a set-top box of the data-receiving peer network. By examining data packet payloads and/or packet headers, the set-top box of the data-receiving peer network can intelligently route data to a most appropriately-matched device (e.g. a display monitor, a refrigerator, a security camera, an IR device which actually triggered data transfer from the data-transferring peer network, and etc.) locally connected within the data-receiving peer network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for controlling a network-connected device in one peer network from an infrared device connected to another peer network, the apparatus comprising:
   a first peer network comprising a first set-top box and the infrared device, wherein the infrared device locally connected to the first set-top box requests a native function transfer of a device locally connected to a second set-top box in a second peer network, wherein the device locally connected to the second set-top box in the second peer network utilizes a communication protocol unknown and incompatible to the first set-top box and the infrared device of the first peer network, and wherein the native function transfer is defined as a remote takeover of the device's native hardware settings that were previously unavailable outside of the second peer network, prior to an authorization of the native function transfer;
   a local area network and/or a wide area network operatively connected to the first set-top box of the first peer network and the second set-top box of the second peer network; and
   the second peer network comprising the second set-top box and the device locally connected to the second set-top box, wherein the second set-top box authorizes or denies the native function transfer of the device locally connected to the second set-top box to the first peer network, wherein the authorization of the native function transfer from the second set-top box triggers the first set-top box in the first peer network to construct a peer-device control map in its local memory block, which enables the infrared device of the first set-top box to remotely takeover the device's native hardware settings that were previously unavailable outside of the second peer network, prior to the authorization of the native function transfer to the first peer network.

2. The apparatus of claim 1, wherein the infrared device is a commanding device capable of displaying a current status of the one or more networked devices across the plurality of peer networks.

3. The apparatus of claim 1, further comprising an optionally-connected device outside of the plurality of peer networks.

4. The apparatus of claim 3, wherein the optionally-connected device outside of the plurality of peer networks is a network attached storage or a device state and location server.

5. A method for controlling a network-connected device in a second peer network from an infrared device connected to a first peer network, the method comprising steps of:
   initiating a command from the infrared device of the first peer network to request a native function transfer of a device locally connected to a second set-top box of the second peer network, wherein the device locally connected to the second set-top box in the second peer network utilizes a communication protocol unknown and incompatible to a first set-top box and the infrared device of the first peer network, and wherein the native function transfer is defined as a remote takeover of the device's native hardware settings that were previously unavailable outside of the second peer network, prior to an authorization of the native function transfer;
   attempting to authenticate and/or authorize the command from the infrared device to the second set-top box;
   informing the infrared device and/or the first set-top box in the first peer network an authorization or a denial of the command from the second set-top box; and
   if the authorization for the command is granted by the second set-top box:
      constructing a peer-device control map in a local memory block of the first set-top box, which enables the infrared device of the first set-top box to remotely takeover the device's native hardware settings that were previously unavailable outside of the second peer network, prior to the authorization of the native function transfer to the first peer network.

* * * * *